No. 671,863. Patented Apr. 9, 1901.
S. L. MITCHELL.
WAGON.
(Application filed Aug. 27, 1900.)
(No Model.)
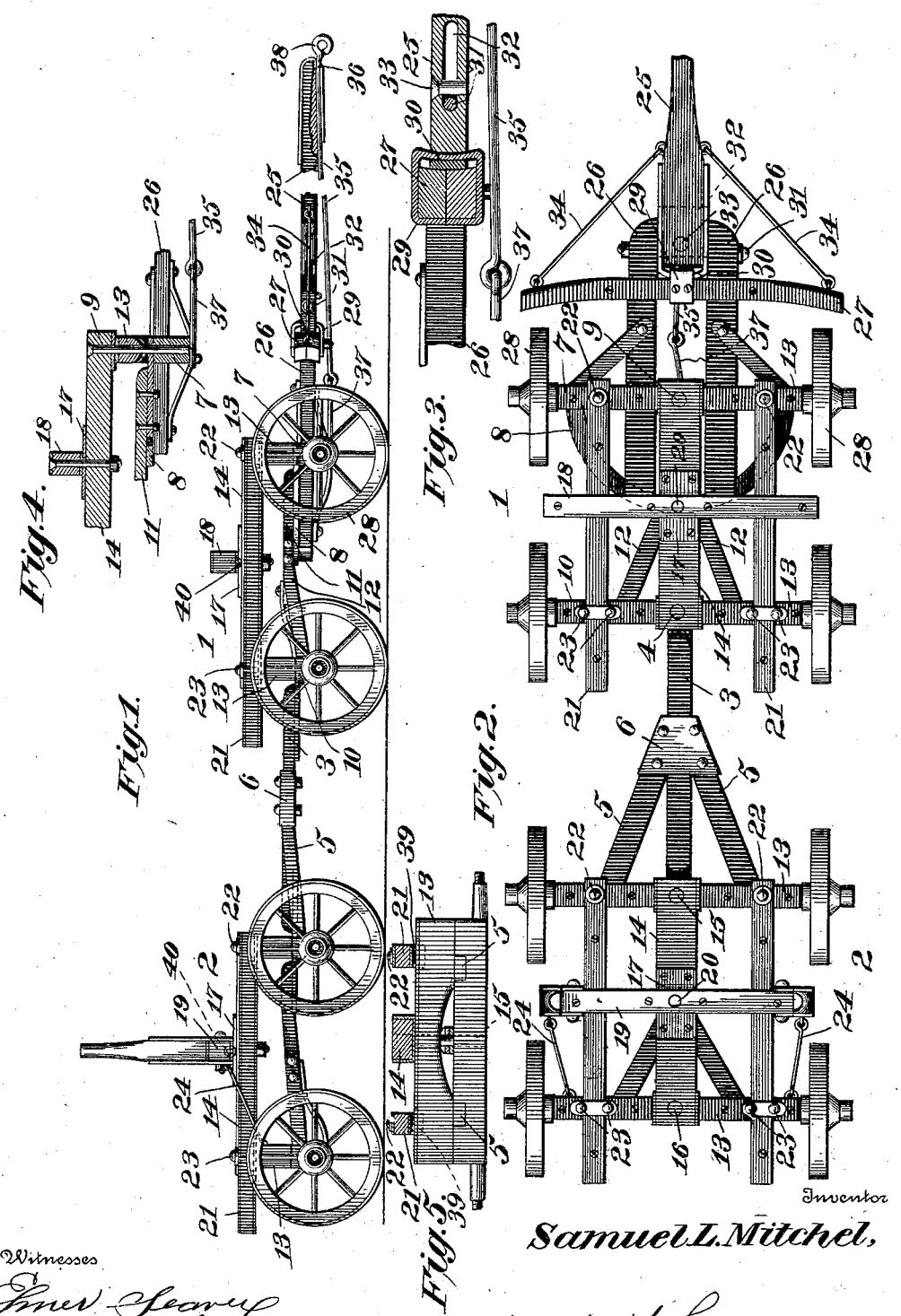
Witnesses
Omer Searcy
Geo. P. Kingsbury
Inventor
Samuel L. Mitchel,
By Mason Fenwick & Lawrence
his Attorneys
THE NORRIS PETERS CO., PHOTO-LITHO., WASHINGTON, D. C.

UNITED STATES PATENT OFFICE.

SAMUEL L. MITCHELL, OF TALAWAH, MISSISSIPPI.

WAGON.

SPECIFICATION forming part of Letters Patent No. 671,863, dated April 9, 1901.

Application filed August 27, 1900. Serial No. 28,194. (No model.)

*To all whom it may concern:*

Be it known that I, SAMUEL L. MITCHELL, a citizen of the United States, residing at Talawah, in the county of Marion and State of Mississippi, have invented certain new and useful Improvements in Wagons; and I do hereby declare the following to be a full, clear, and exact description of the invention, such as will enable others skilled in the art to which it appertains to make and use the same.

My invention relates to improvements in wagons for handling materials of considerable length, particularly wagons which are adapted to carry long poles or logs as well as lumber of any sort or rails of various kinds.

It consists in a wagon comprising trucks pivotally connected with each other, the axles of each of the said trucks being capable of a pivotal movement with respect to each other, and bolsters pivotally mounted upon the trucks for supporting the material to be carried, whereby the wagon can be turned in different directions beneath the bolsters without affecting the load.

It also consists in a wagon comprising two or more trucks pivoted together, bolsters supported by the said trucks, and a brake adapted to engage the front wheels of the wagon, said brake being carried by the pole of the wagon and adapted to be forced thereby against the front wheels when the horses are backed or stopped.

It also consists in certain other novel constructions, combinations, and arrangements of parts, as will be hereinafter fully described and claimed.

In the accompanying drawings, Figure 1 represents a side elevation of a wagon constructed in accordance with my invention. Fig. 2 represents a top plan view of the same. Fig. 3 represents a detail view in section, illustrating the manner of mounting the rear end of the tongue or pole. Fig. 4 is a detail sectional view through the front axle and running-gear of the front truck, and Fig. 5 is a detail elevation of one of the axles and its axle-beam.

My improved wagon is so constructed that materials of great length can be carried without the necessity of their projecting long distances beyond the ends of the wagon and are so supported that the trucks of the wagon can be freely and easily turned and that the whole wagon will bend itself to any turn irrespective of the load which it is carrying.

The wagon is made up preferably of two trucks, a forward truck 1 and a rear truck 2, which are connected by means of a reach or pole 3, which is rigidly secured at its rear end to the front axle of the rear truck and pivotally secured at its front end, as at 4, to the rear axle of the front truck. This reach or pole 3 is preferably braced by bounds 5 5, and suitable hound-plates, as 6, may be also used to further strengthen the structure at this point. Each of the trucks is provided with front and rear axles, which are pivotally connected with each other, so that they may be turned, as in the usual wagon running-gears. The forward axle 7 of the front truck 1 is provided with the usual fifth-wheel 8 and turns upon a king-bolt 9, which extends downwardly through upper and lower axle-beams. The rear axle 10 of the first truck is connected by means of a reach 11 with the front axle of the rear truck, said reach at its forward end pivotally engaging the king-bolt 9, while its rear end is held in position by means of the pivot-pin 4. This reach is also preferably strengthened by suitable hounds, as 12 12. The axles each preferably carry axle-beams above them, as at 13 13, and three of these axle-beams—namely, the two of the front truck and the front one of the rear truck—are cut away upon their under sides at their center portions to accommodate the pivotal connections between the parts of the trucks and between the trucks through the agency of the reaches or poles. The rear end of the front reach 11 and the front end of the middle reach 13 extend into the same opening beneath the axle-beam of the rear axle 10 on the front truck, the same pivot-pin 4 serving to hold both the reaches in place. The front and rear axles of each truck are also pivotally connected by means of bolster-supporting beams 14 14, which extend from the central points of each forward axle to the central points of the rear axles. The beam 14 on the front truck is held in position by the king-bolt 9 and the pivot-pin 4, while the beam 14 on the rear truck is held in position by the king-bolt 15 and a pin or bolt 16, which passes through the rear axle of the truck. This beam not only supports the bolsters, but forms additional strengthening means for holding the axles in the proper position. The central portions of the beams 14 14 are preferably formed with a bearing-surface, as at 17 17, and pivotal bolsters, as 18 or 19, are mounted upon these bearing-plates 17. A pivot-pin, as at 20, holds each of the bolsters pivotally in position upon the supporting-beams 14. These bolsters, therefore, when supporting a load are free to be controlled by the said load irrespective of the movement of the trucks beneath them. In order to fully support these bolsters and prevent their tipping at their ends, I preferably connect the front and rear axle beams of each truck by means of supporting-bars 21 21. These bars are pivotally secured at their forward ends at 22 22 to the bolster-beams of the forward axles of each truck. Their rear ends extend loosely between guide pins or bolts 23 23, which are secured to the rear bolster-beams of each truck. Each of the bars 21 extends sufficiently far to the rear of these guide-pins to permit of the truck being turned to its full extent without drawing them out of the said guides. These bars will constitute a constant and accommodating support for the ends of the pivoted bolsters 18 and 19. Suitable uprights may be mounted upon the ends of the bolsters for holding the logs, timber, or other materials in position upon the said bolsters. In order to hold the bolsters in proper position while loading the truck, I preferably temporarily connect them with the rear axles of each truck by means of hook-links, as 24 24, which may be readily disconnected after the load has been placed in position and the wagon is ready to be moved. In connection with this structure I arrange the tongue of the vehicle so that it may carry a brake for the front wheels. For this purpose the tongue 25 is mounted between the forwardly-extending bars 26 26, which are secured to the front axle and are arranged with a sufficient space between them to accommodate the said tongue. Sliding upon these beams 26 26 is a brake-bar, as 27, which is made sufficiently long to project at its ends in front of the vehicle-wheels 28. The ends of this brake-bar are made to conform with the shape of the wheel and, if desired, may be shod with any suitable braking-surface. The beam 27 is provided with slots for loosely engaging the supporting-beams 26 26, so that it is free to slide back and forth upon the same. The beam 27 has secured to its central portion a clip or band 29, which is firmly secured thereto and has a sufficient space left between it and the front side of the beam 27 to accommodate the movement of a clip 30, secured to the rear end of the tongue 25. The tongue is also pivoted at its rear end upon a pivot pin or bolt 31, so that the pole is free to be moved up or down, according to the movement of the team pulling the wagon. The pin 31 passes through a longitudinal slot, as 32, formed in the end of the tongue, and through the side portions of the clip 30, so that when the team backs or stands still the wagon can run upon the brake-beam 27—that is to say, the beams 26 can move forward with respect to the tongue 25 and the wheels 28 can run against the ends of the brake-beam 27, which will be thus applied according to the force with which the wagon is propelled forward. As soon as the team is moved forward again the tongue will move forward upon the pin 31, carrying the brake-bar 27 with it and free the same from its contact with the wheels, and when the tongue has reached the limit of the elongated slot 32 it will begin to pull the wagon through the agency of the pin 31 and the bars or beams 26. The clip 29 is made of sufficient height with respect to the clip 30 to accommodate the pivotal movement of the rear end of the tongue 25. When it is desired to back the team, and thus not apply the brake, the rearward movement of the tongue is prevented by inserting a pin, as at 33, in front of the pin 31. This will prevent any movement of the tongue upon the said pin, and when the team is backed it will force the wagon backward without applying the brake. The ends of the brake-beam are preferably strengthened and braced with respect to the tongue 25 by means of connecting rods or links, as 34 34.

When other teams besides the pole-team are employed in pulling the wagon, I preferably connect them with the wagon by means of a draft mechanism which does not pull directly upon the pole 25. This comprises a draft-rod 35, which slides through a bearing 36 at the forward end of the pole and is connected directly with the front axle by means of a link 37. The forward team, therefore, which may be hitched to an eye 38 in the forward end of the draft-rod 35, will pull directly upon the front axle of the wagon, and the action of the pole or rear team in applying the brake will be entirely irrespective of the action of the front team.

If desired, antifrictional means may be interposed between the sliding ends of the bars 21 21 and the rear axle of each truck, comprising rollers, as 39. Antifrictional rollers 40 40 may be also applied to the under sides of the bolsters 18 and 19, so as to engage the beams 21 21, and thus reduce the friction between the parts.

From the above description it will be evident that my improved wagon is especially well adapted for handling long articles, such as long beams and rails or poles and lumber of every description. It will be seen that the wagon is so connected up that it can accommodate itself to any turn and will not take so much room in turning as a wagon which has a long reach. The operation of the axles of the different trucks also is so separate from the load and so connected with the load-bearing bolsters that their movement does not affect the load in any way except to properly carry it along, the load not interfering in the least with the turning of the vehicle.

Having now described my invention, what I claim as new, and desire to secure by Letters Patent, is—

1. A vehicle comprising two or more double trucks pivotally connected together, said trucks having axles pivoted with respect to each other and means for supporting a load between the double trucks, the structure being such that the trucks can turn irrespective of the load, substantially as described.

2. A wagon or vehicle comprising two double trucks pivotally connected together, pivotal bolsters mounted upon each truck, and means for turning the axles of the trucks with respect to each other so that the load may be carried in any direction, substantially as described.

3. A wagon made up of trucks pivotally connected with each other, reaches pivotally connecting the front and rear axles of each truck, bolster-bearing bars also connecting the front and rear axles of the said trucks, bolsters pivotally mounted upon the said bolster-bars, whereby the trucks will be free to turn beneath the bolsters and their loads, substantially as described.

4. A wagon comprising groups of two or more axles, a series of reaches pivotally connecting all of the axles whereby every axle may be moved with respect to its neighboring axle, bolsters pivoted above the said axles whereby loads of various lengths can be supported above the axles and not interfere with their operation in the least when the vehicle is turned, substantially as described.

5. A wagon comprising front and rear trucks, axles forming each truck and pivotally connected by means of suitable reaches, a reach pivotally connecting the front and rear trucks, bolster-supporting beams connecting the axles of each truck, bolsters pivotally mounted thereon, bearer-bars pivotally connected with one axle of each truck and sliding through guides upon the other axle of each truck, the said bars extending beneath the ends of the said bolsters for preventing their tipping whereby the trucks may move beneath the bolsters without being interfered with by the load in turning the wagon, substantially as described.

6. A wagon comprising a forward and rear truck, bearer-beams pivotally connected to the front and rear axles of each truck, a bolster mounted upon the said bearer-beams, axle bearer-bars connecting the front and rear axles of the trucks and extending beneath the outer ends of the pivotal bolsters, the said axle-bars being pivotally attached at one of their ends to one axle and guides upon the other axle of each truck for movably holding the said axle-bars in position, whereby the trucks can be turned in one direction and the bars will accommodate themselves to such a movement and yet will always afford a support to the pivotal bolsters above them, substantially as described.

In testimony whereof I affix my signature in presence of two witnesses.

SAMUEL L. MITCHELL.

Witnesses:
J. L. DOBSON,
G. W. HOLLEMAN.